(12) United States Patent
Eck et al.

(10) Patent No.: US 7,264,475 B1
(45) Date of Patent: Sep. 4, 2007

(54) CURRICULUM MANAGEMENT

(75) Inventors: Hagen Eck, Heidelberg (DE); Rudolf Winkel, Angelbachtal (DE); Marcus Philipp, Mannheim (DE); Christian Hochwarth, Wiesloch (DE)

(73) Assignee: SAP AG, Walldorf (DE)

( * ) Notice: Subject to any disclaimer, the term of this patent is extended or adjusted under 35 U.S.C. 154(b) by 483 days.

(21) Appl. No.: 10/623,140

(22) Filed: Jul. 17, 2003

Related U.S. Application Data

(60) Provisional application No. 60/396,106, filed on Jul. 17, 2002.

(51) Int. Cl.
*G09B 3/00* (2006.01)

(52) U.S. Cl. ........................ 434/322; 434/350

(58) Field of Classification Search ............... 434/118, 434/322, 350
See application file for complete search history.

(56) References Cited

U.S. PATENT DOCUMENTS

| | | |
|---|---|---|
| 5,008,853 A | 4/1991 | Bly et al. |
| 5,310,349 A | 5/1994 | Daniels et al. |
| 5,395,243 A | 3/1995 | Lubin et al. |
| 5,584,699 A | 12/1996 | Silver |
| 5,675,802 A | 10/1997 | Allen et al. |
| 5,727,950 A * | 3/1998 | Cook, et al. ............... 434/350 |
| 5,788,508 A | 8/1998 | Lee et al. |
| 5,802,514 A | 9/1998 | Huber |
| 5,881,315 A | 3/1999 | Cohen |
| 6,011,949 A | 1/2000 | Shimomukai |
| 6,014,134 A | 1/2000 | Bell et al. |
| 6,091,930 A | 7/2000 | Mortimer et al. |
| 6,099,320 A | 8/2000 | Papadopoulos |
| 6,112,049 A | 8/2000 | Sonnenfeld |
| 6,134,552 A | 10/2000 | Fritz et al. |
| 6,148,338 A | 11/2000 | Lachelt et al. |
| 6,149,438 A | 11/2000 | Richard et al. |
| 6,149,441 A | 11/2000 | Pellegrino et al. |
| 6,162,060 A | 12/2000 | Richard et al. |
| 6,164,974 A | 12/2000 | Carlile et al. |
| 6,175,841 B1 | 1/2001 | Loiacono |

(Continued)

FOREIGN PATENT DOCUMENTS

GB   2373625 A   9/2002

OTHER PUBLICATIONS

Jörg Siekmann et al., "Adaptive Course Generation and Presentation," ITS Workshop on Adaptive and Intelligent Web-Based Foundation System, Montreal, The Omega Group; pp. 1-10, 2000.

(Continued)

*Primary Examiner*—Robert E. Pezzuto
*Assistant Examiner*—Cameron Saadat
(74) *Attorney, Agent, or Firm*—Finnegan, Henderson, Farabow, Garrett & Dunner L.L.P.

(57) ABSTRACT

Methods and apparatus, including computer program products, for curriculum management. The techniques include defining a curriculum type that includes one or more curriculum type elements, the curriculum type being a template for a curriculum; and defining a curriculum based on the defined curriculum type by selecting one or more curriculum elements for each of one or more of the curriculum type elements. The defined curriculum can include different types of training courses, including web-based trainings, classroom trainings, and on-the-job trainings.

22 Claims, 4 Drawing Sheets

U.S. PATENT DOCUMENTS

| | | |
|---|---|---|
| 6,315,572 B1 | 11/2001 | Owens et al. |
| 6,336,813 B1 | 1/2002 | Siefert |
| 6,347,333 B2 | 2/2002 | Eisendrath et al. |
| 6,347,943 B1 | 2/2002 | Fields et al. |
| 6,368,110 B1 | 4/2002 | Koenecke et al. |
| 6,370,355 B1 | 4/2002 | Ceretta et al. |
| 6,381,444 B1 | 4/2002 | Aggarwal et al. |
| 6,397,036 B1 | 5/2002 | Thean et al. |
| 6,398,556 B1 | 6/2002 | Ho et al. |
| 6,430,563 B1 | 8/2002 | Fritz et al. |
| 6,470,171 B1 | 10/2002 | Helmick et al. |
| 6,514,085 B2 | 2/2003 | Slattery et al. |
| 6,527,556 B1 | 3/2003 | Koskinen |
| 6,587,668 B1 | 7/2003 | Miller et al. |
| 6,606,480 B1 | 8/2003 | L'Allier et al. |
| 6,622,003 B1 | 9/2003 | Denious et al. |
| 6,633,742 B1 | 10/2003 | Turner et al. |
| 6,643,493 B2 | 11/2003 | Kilgore |
| RE38,432 E | 2/2004 | Fai et al. |
| 6,709,330 B1 | 3/2004 | Klein et al. |
| 6,729,885 B2 | 5/2004 | Stuppy et al. |
| 2001/0044728 A1 | 11/2001 | Freeman et al. |
| 2001/0047310 A1 | 11/2001 | Russell |
| 2002/0006603 A1 | 1/2002 | Peterson et al. |
| 2002/0042041 A1 | 4/2002 | Owens et al. |
| 2002/0061506 A1 | 5/2002 | Catten et al. |
| 2002/0073063 A1 | 6/2002 | Faraj |
| 2002/0138841 A1 | 9/2002 | Ward |
| 2002/0142278 A1 | 10/2002 | Whitehurst et al. |
| 2002/0188583 A1 | 12/2002 | Rukavina et al. |
| 2003/0013073 A1 | 1/2003 | Duncan et al. |
| 2003/0049593 A1 | 3/2003 | Parmer et al. |
| 2003/0073063 A1 | 4/2003 | Dattaray et al. |
| 2003/0073065 A1 | 4/2003 | Riggs |
| 2003/0082508 A1 | 5/2003 | Barney |
| 2003/0113700 A1 | 6/2003 | Simon |
| 2003/0129576 A1 | 7/2003 | Wood et al. |
| 2003/0151629 A1 | 8/2003 | Krebs et al. |
| 2003/0152899 A1 | 8/2003 | Krebs et al. |
| 2003/0152900 A1 | 8/2003 | Krebs et al. |
| 2003/0152901 A1 | 8/2003 | Altenhofen et al. |
| 2003/0152902 A1 | 8/2003 | Altenhofen et al. |
| 2003/0152903 A1 | 8/2003 | Theilmann |
| 2003/0152904 A1 | 8/2003 | Doty, Jr. |
| 2003/0152905 A1 | 8/2003 | Altenhofen et al. |
| 2003/0152906 A1 | 8/2003 | Krebs et al. |
| 2003/0157470 A1 | 8/2003 | Altenhofen et al. |
| 2003/0163784 A1 | 8/2003 | Daniel et al. |
| 2003/0175664 A1 | 9/2003 | Frangenheim et al. |
| 2003/0175676 A1 | 9/2003 | Theilmann et al. |
| 2003/0211447 A1 | 11/2003 | Diesel et al. |
| 2003/0224339 A1 | 12/2003 | Jain et al. |
| 2004/0081951 A1 | 4/2004 | Vigue et al. |

OTHER PUBLICATIONS

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al., "Modeling Constructivist Teaching Functionality and Structure in the KBS Hyperbook System," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

x.hlp, "Software for faster learning," http://www.xhlp.com/home.cfm, Apr. 2003, 7 pgs.

Global Knowledge Network, Inc., "On Demand Personal Navigator," http://kp.globalknowledge.com/products/od/index.asp , Sep. 2002, 2 pgs.

U.S. Appl. No. 60/201,500, filed May 3, 2000, Adams.

U.S. Appl. No. 60/272,251, filed Feb. 28, 2001, Ward.

U.S. Appl. No. 60/329,088, filed Oct. 12, 2001, Riggs.

U.S. Appl. No. 60/334,714, filed Nov. 1, 2001, Diesel.

U.S. Appl. No. 60/400,606, filed Aug. 1, 2002, Diesel.

Hewlett Packard, "HP Open View Integration Guide for Developers," Jul. 2002, [online], [retrieved from the Internet on Mar. 24, 2004: http://h21007.www2.hp/com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Sun Microsystems, "Developing Web Services with SUN™ Open Network Environment," Mar. 2002, [online], [retrieved from the Internet Mar. 24, 2004: http:wws.sun.com/software/sunone/wp-spine/spine.pdf], pp. 1-32, XP002274909.

Trythall, Steve, "JMS and COBRA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

* cited by examiner

CURRICULUM MANAGEMENT

CROSS-REFERENCE TO RELATED APPLICATIONS

This application claims the benefit of U.S. patent application Ser. No. 60/396,106, filed Jul. 17, 2002, the contents of which are incorporated by this reference.

BACKGROUND

The present invention relates to data processing by digital computer, and more particularly to curriculum management.

Existing curriculum management systems typically only support certain types of curriculums. For example, some systems require that all the training courses within the curriculum be of the same training type.

Existing curriculum management system also typically do not support the creation of curriculum templates or the subsequent reuse of the curriculum templates to create one or more specific curriculums.

SUMMARY OF THE INVENTION

The present invention provides methods and apparatus, including computer program products, for curriculum management. The techniques include defining a curriculum type that includes one or more curriculum type elements, the curriculum type being a template for a curriculum; and defining a curriculum based on the defined curriculum type by selecting one or more curriculum elements for each of one or more of the curriculum type elements.

The invention can be implemented to include one or more of the following features. Metadata associated with the curriculum type can be used to check the consistency of the curriculum type. The defined curriculum can include different types of training courses, including web-based trainings, classroom trainings, and on-the-job trainings.

The invention can be implemented to realize one or more of the following advantages. Using curriculum types, administrators can define a curriculum in the abstract. This enables a curriculum to be defined without specifying actual course dates, locations, instructors and other details. Once a curriculum type is defined, it can be used later as the basis for defining one or more specific curriculums.

Different types of trainings can be combined into a single curriculum. The curriculum need not be limited to a single linear sequence of courses.

Participants can view and register for curriculums without administrative intervention. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
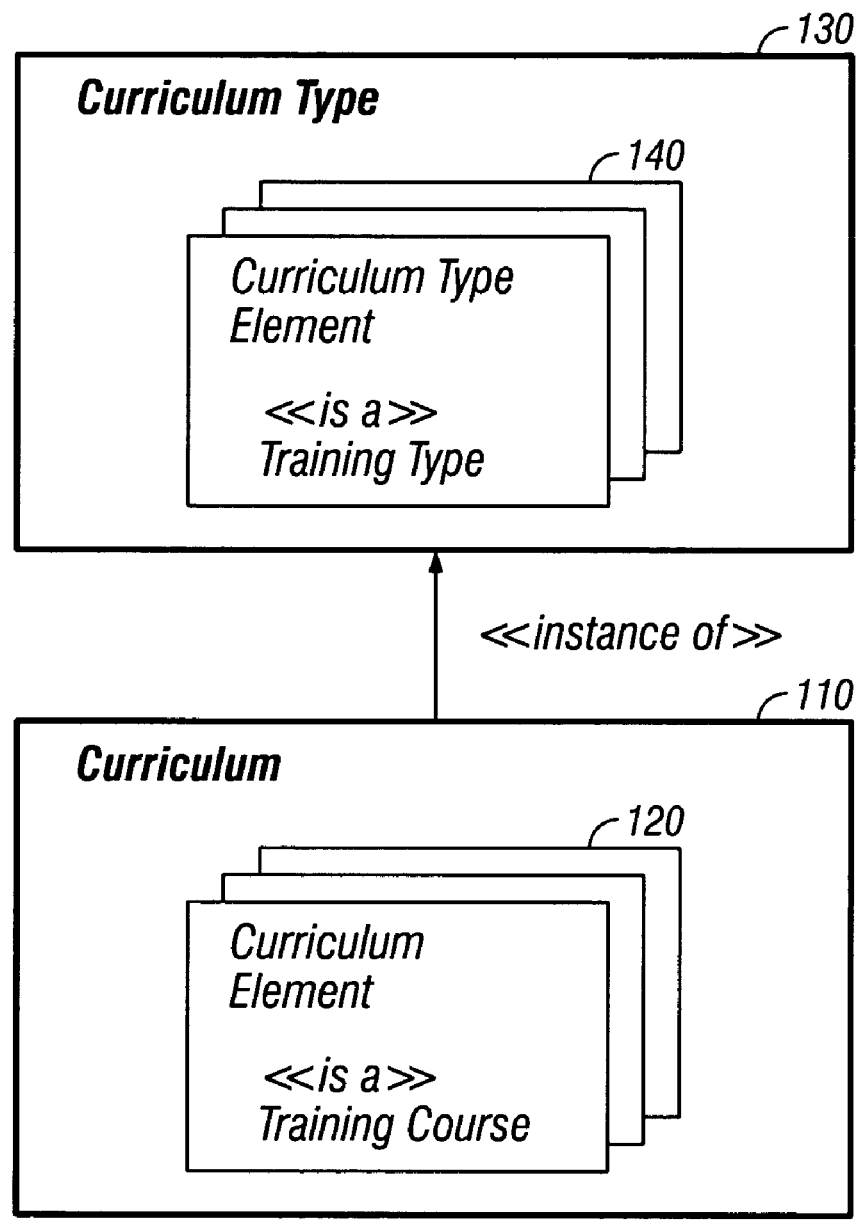
FIG. 1 is a block diagram of curriculums and curriculum types.

As shown in FIG. 1, a curriculum 10 is a set of curriculum elements 120 that provide a coordinated set of knowledge and skills. The curriculum elements 120 are training courses of different types including web-based trainings, classroom trainings, and on-the-job trainings. An on-the-job training is a training that includes one or more work assignments and a required time interval for completing the work assignments. A classroom training is a live training that is given by an instructor in a fixed location at a fixed time. A web-based training is a training that is delivered over the Internet. With web-based trainings, there is typically not a fixed location and there often is not a fixed time either. Examples of web-based trainings include on-line tutorial programs and presentations.

A curriculum type 130 is a blueprint or template for a curriculum 110. Curriculum types enable the contents and structure of a curriculum to be planned generically without planning specific training courses. Once a curriculum type is defined, one or more curriculums can then be created using the curriculum type.

The elements within a curriculum type will be referred to as curriculum type elements 140. A curriculum type definition specifies which curriculum type elements 140 will be included in the curriculum type and how the curriculum type elements 140 are to be arranged.

One example of a curriculum type definition is A→B→C. This definition states that curriculum type element A must be completed prior to curriculum type element B which must be completed prior to curriculum type element C. Another example of a curriculum type definition is (A, D)→B→C. This definition states that curriculum type elements A and D are interchangeable, i.e. A→D→B→C and D→A→B→C are valid sequences of training for a curriculum of this curriculum type.

Figure 4:
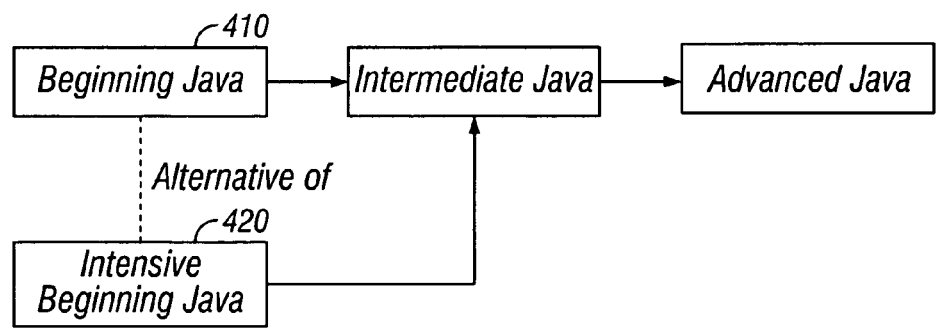
FIG. 4 is a block diagram of curriculum type elements and alternative elements.

For each curriculum type element, one or more alternative elements can be specified. A curriculum type definition of [A, A']→B→C states that the curriculum type elements A and A' are alternative elements and thus A→B→C and A'→B→C are valid sequences of curriculum type elements for this curriculum type. For example, as shown in FIG. 4, a "Beginning Java" curriculum type element 410 can have an associated alternative curriculum element "Intensive Beginning Java" curriculum type element 420.

Figure 2:
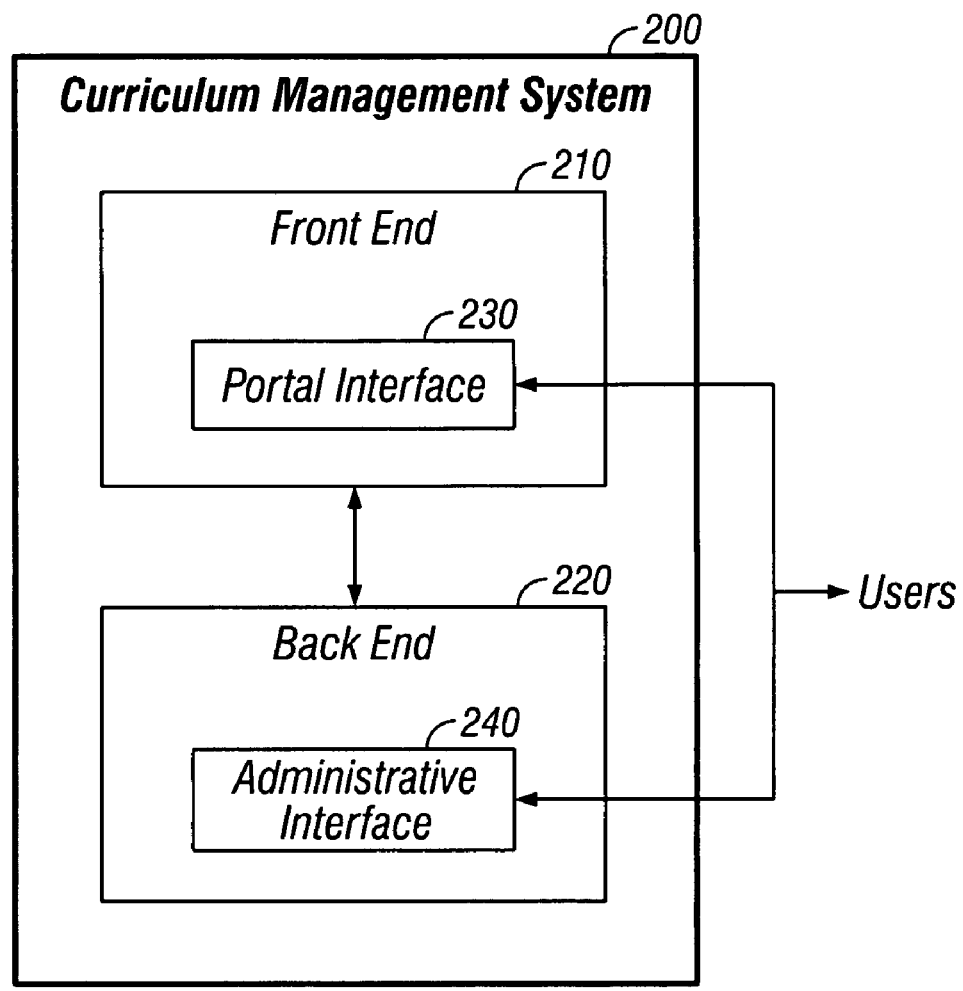
FIG. 2 is a block diagram of a system in accordance with the invention.

As shown in FIG. 2, a system 200 for curriculum management in accordance with the invention includes a front-end component 210 and a back-end component 220. The front-end component 210 provides a user interface 230 through which users, for example, training participants, can view and search for curriculums and curriculum types, register for curriculums, and cancel curriculum registrations. The portal interface 230 can be a web-based interface such as a web portal. One such web portal is the SAP Learning Solution Portal. The front end 210 can be implemented using a web application server such as, for example, the SAP Web Application Server 6.10.

The back-end component 220 provides a user interface 240 through which users, for example, curriculum planners and other training administrators, can define curriculum types and curriculums, register a participant for a curriculum, cancel a curriculum registration, transfer a registered participant from one curriculum to another, substitute a participant for another participant, block and unblock a curriculum, and perform administrative tasks such as follow-up, billing, correspondence, and performance compensation. The back-end component 220 can be implemented using a server, such as, for example, the SAP R/3 Release 4.6C extended with the Learning Solution plug-in.

The system 200 can be a stand-alone system or alternatively, can be a component of a larger training system. The larger training system can support the creation of individual training courses and the registration for such individual training courses. One such larger training system is the Learning Solution available from SAP AG of Walldorf, Germany.

Definition of a Curriculum Type

Figure 3:
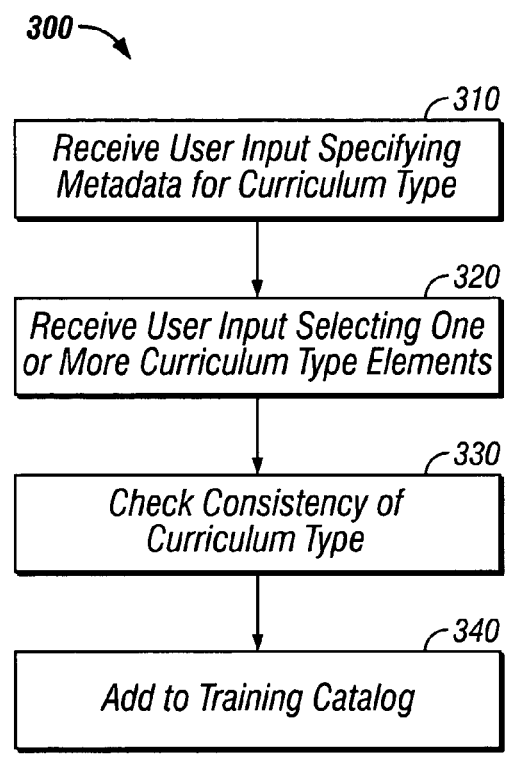
FIG. 3 is a flow diagram of a method in accordance with the invention.

As shown in FIG. 3, a method 300 for defining a curriculum type in accordance with the invention includes the following steps. The system receives user input specifying metadata for the curriculum type (step 310). The metadata can include, for example, a title, content description, capacity, period of validity, target participants, prerequisites, and qualifications for the curriculum type. The qualifications specify what qualifications are imparted by the curriculum type. The prerequisites specify the qualifications necessary for participating in the curriculum type. The metadata can also include administration guidelines, for example, registration, billing, correspondence, or follow-up guidelines. The guidelines can specify whether the administrative tasks are performed for the curriculum type as a whole or for each individual curriculum type element.

The system receives user input selecting one or more curriculum type elements for the curriculum type (step 320). In one implementation, the system can display a list of curriculum type elements for the user to choose from. The system can be configured to filter the list according to certain criteria, for example, according to the prerequisites or target participants information for the curriculum type.

The user input can also specify the sequencing of the curriculum type elements. Alternatively, the system can automatically determine a sequencing based on metadata for the curriculum type elements. For example, the system can use prerequisites and qualifications information to determine which curriculum type elements must precede other curriculum type elements.

The system checks the consistency of the curriculum type (step 330). The consistency check can involve using metadata to determine the consistency of the sequencing. For example, the prerequisites and qualifications of successive curriculum type elements can be checked against each other to identify gaps (e.g., a prerequisite for a curriculum type element is not satisfied by the qualification imparted by any of the preceding curriculum type elements). Once the curriculum type is correct and complete, the system adds the curriculum type to a training catalog (step 340).

Definition of a Curriculum Based on a Curriculum Type

The system can manage different types of curriculums including fixed curriculums, variable curriculums, and dynamic curriculums. A fixed curriculum is one in which there is a training course associated with every curriculum type element in the curriculum type upon which the curriculum is based. A variable curriculum is a fixed curriculum, which contains alternative elements. A dynamic curriculum is a curriculum in which at least one curriculum element does not have an associated training course.

Figure 5:
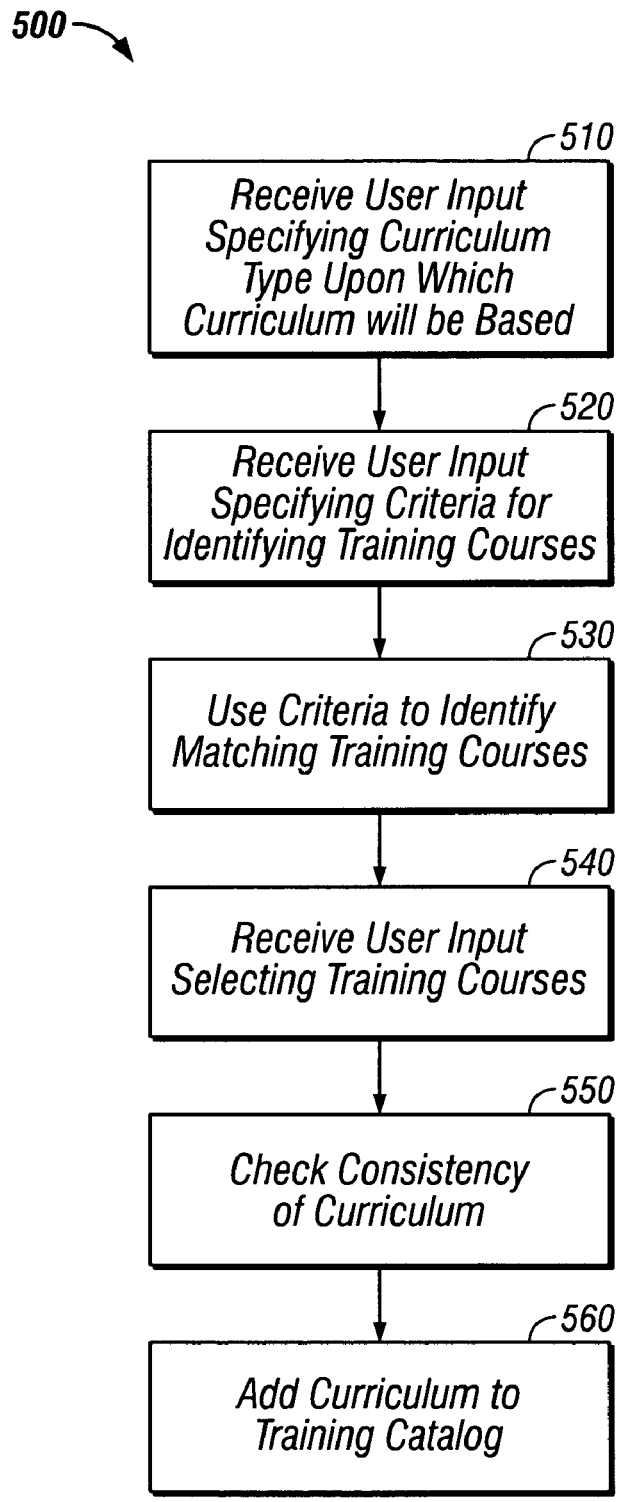
FIG. 5 is a flow diagram of a method in accordance with the invention.

As shown in FIG. 5, a method 500 for defining a curriculum in accordance with the invention includes the following steps.

The system receives user input specifying a curriculum type upon which the curriculum will be based (step 510). In one implementation, the system can display a list of available curriculum types for the user to choose from.

The system receives user input specifying criteria to be used in identifying training courses (step 520). The criteria can include, for example, course dates, course locations, or languages used for instruction.

The system uses the specified criteria to identify a list of matching training courses for each curriculum type element in the specified curriculum type (step 530). For each curriculum type element (and its alternatives) the matching training courses are displayed. The user then chooses one (for a fixed curriculum) or more (for a variable curriculum) of these training courses. If groups of interchangeable curriculum type elements are in the curriculum, then the user specifies which one of them is processed first, second, and so on.

The system receives user input selecting a training course for one or more of the curriculum elements and generates a curriculum based on the user selections (step 540). For pre-defined curriculums, a single training course is selected for each curriculum type element or one of its alternatives. For variable curriculums, more than one training course is selected for each curriculum element or its alternative elements.

The system checks the consistency of the curriculum (step 550). The consistency check can involve using metadata to determine that the selected courses meet the requirements of the curriculum. For example, the capacity of each course can be checked to verify that it meets the capacity requirements for the curriculum. In the example of FIG. 4, the "Beginning Java" course has a capacity of 30 students, but the "Intensive Beginning Java" course has a capacity of only 10 students. In this case, the consistency check would fail. To correct this inconsistency, two additional instances of the "Intensive Beginning Java" course can be added to the curriculum.

Once the curriculum is correct and complete, the system adds the curriculum to a training catalog (step 560).

Planning of Curriculum Attendance

Through the learning portal 230 provided by the front-end component 210 of the system 200, users can select curriculums to attend and record the selected curriculums in a user-specific training plan that is stored in the system 200. The system 200 displays the training catalog to the user and the user selects a curriculum from the training catalog.

The system can validate the selection, for example, by comparing the selection against a stored user profile for the user. The user profile can contain information such as the learner's qualifications and course schedule. If the user does not meet the prerequisites for the selected curriculum or if there is a time conflict, then the selection is invalid. Once the selected curriculum has, been validated, the system adds the selected curriculum to the user's training plan.

Registration for Courses

The learning portal 230 provided by the front-end component 210 of the system 200 also enables users to register for curriculums. Users can register for a curriculum by directly selecting a curriculum from the training catalog and registering for the selected curriculum. Alternatively, users can select a curriculum from the user's training plan. In either case, the system can check the user's authorization to register for the curriculum. If the user is authorized to register for the curriculum, the system allows the user to submit a payment arrangement. The system can check the validity of the payment arrangement. If the payment arrangement is valid, the system can determine whether there is space available in the curriculum.

The system can prevent the registration of a user if certain conditions are not met. Such conditions include: if there is no space available in the curriculum, if the credit standing of the user is not adequate, if the payment arrangement is not valid, if the user does not meet the curriculum prerequisites, or if the user is not recognized by the system.

Additional Features

The system can support one or more of the following features. The curriculum can include optional courses that do not need to be completed in order to complete the curriculum. Such optional courses include preliminary courses that are designed to bring less qualified participants to the same starting level of knowledge as other participants, and special interest courses that are designed to provide additional knowledge not part of the standard curriculum.

The procedure for defining curriculum types can be extended to include steps for generating suitable follow-up or predecessor training courses. The steps can involve analyzing the goals or prerequisites for the curriculum type.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices' for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer-implemented method for curriculum management, comprising:

electronically receiving input from a user specifying metadata for defining a curriculum type that includes one or more curriculum type elements, the curriculum type being a template for a curriculum that enables content and structure of a curriculum to be defined generically without planning specific training courses, wherein the curriculum type elements are arranged according to a curriculum type definition that specifies interchangeable or alternative curriculum type elements that provide valid sequences of the curriculum;

automatically determining a sequencing of the one or more curriculum type elements based on the metadata; and adding the curriculum type to a training catalog.

2. The computer-implemented method for curriculum management of claim 1, wherein the metadata includes a title, content description, capacity, period of validity, target participants, prerequisites, and qualifications for the curriculum type.

3. The computer-implemented method for curriculum management of claim 1, wherein the metadata specifies prerequisites for the curriculum type.

4. The computer-implemented method for curriculum management of claim 1, wherein the metadata specifies a capacity for the curriculum type.

5. The computer-implemented method for curriculum management of claim 1, wherein the metadata specifies target participants for the curriculum type.

6. The computer-implemented method for curriculum management of claim 1, wherein the user may select the one or more curriculum type elements from a list shown on a display.

7. The method of claim 1, wherein the selected curriculum type elements include different types of training courses.

8. The method of claim 7, wherein the different types of training courses include web-based trainings, classroom trainings, and on-the-job trainings.

9. The computer-implemented method for curriculum management of claim 1, wherein defining a curriculum based on the defined curriculum type includes generating a list of training courses that match a particular curriculum type element and receiving user input selecting a training course from the list.

10. The computer-implemented method for curriculum management of claim 1, wherein automatically determining the sequencing of the curriculum type elements includes using prerequisites and qualifications information of the metadata to check the consistency of the curriculum type.

11. A computer program product, tangibly embodied in an information carrier, for curriculum management, the computer program product comprising instructions operable to cause a data processing apparatus to:
   electronically receive input from a user specifying metadata to define a curriculum type that includes one or more curriculum type elements, the curriculum type being a template for a curriculum that enables content and structure of a curriculum to be defined generically without planning specific training courses, wherein the curriculum type elements are arranged according to a curriculum type definition that specifies interchangeable or alternative curriculum type elements that provide valid sequences of the curriculum;
   automatically determine a sequencing of the curriculum type elements based on the metadata; and
   add the curriculum type to a training catalog.

12. The product of claim 11, wherein the metadata includes a title, content description, capacity, period of validity, target participants, prerequisites, and qualifications for the curriculum type.

13. The product of claim 11, wherein the metadata specifies prerequisites for the curriculum type.

14. The product of claim 11, wherein the metadata specifies a capacity for the curriculum type.

15. The product of claim 11, wherein the metadata specifies target participants for the curriculum type.

16. The product of claim 11, wherein a list is displayed from which the user may select the one or more curriculum type elements.

17. The product of claim 11, wherein the selected curriculum type elements include different types of training courses.

18. The product of claim 17, wherein the different types of training courses include web-based trainings, classroom trainings, and on-the-job trainings.

19. The product of claim 11, wherein to define a curriculum based on the defined curriculum type includes to generate a list of training courses that match a particular curriculum type element and to receive user input selecting a training course from the list.

20. The product of claim 11, wherein automatically determining the sequencing of the curriculum type elements includes using prerequisites and qualifications information of the metadata to check the consistency of the curriculum.

21. A system for curriculum management, the system comprising:
   a back-end component that:
   electronically receives input from a user specifying metadata to define a curriculum type that includes one or more curriculum type elements, the curriculum type being a blueprint for a curriculum that enables content and structure of a curriculum to be defined generically without planning specific training courses, wherein the curriculum type elements are arranged according to a curriculum type definition that specifies interchangeable or alternative curriculum type elements that provide valid sequences of the curriculum;
   automatically determines a sequencing of the curriculum type elements based on the metadata;
   electronically checks a consistency of the curriculum type using the metadata; and
   a front-end component in communication with the back-end component, wherein the front-end component registers the user in the curriculum.

22. The system of claim 21, wherein the back-end component and the front-end component each have a separate user interface.

* * * * *